United States Patent [19]

Hahn

[11] 4,186,945

[45] Feb. 5, 1980

[54] TRANSITION SLEEVE FOR A CABINET OR THE LIKE

[75] Inventor: Thomas M. Hahn, Louisville, Ky.

[73] Assignee: General Electric Company, Louisville, Ky.

[21] Appl. No.: 864,979

[22] Filed: Dec. 27, 1977

[51] Int. Cl.² ............................................. F16L 35/00
[52] U.S. Cl. .......................................... 285/19; 16/2; 29/450; 29/460; 62/DIG. 13; 174/153 G; 285/110; 285/158; 285/205; 285/81; 285/360
[58] Field of Search ..................... 285/19, 20, 81, 158, 285/110, 192, 205, 208, 209, 360; 16/2; 52/309.2, 787; 174/65 G, 152 G, 153 G; 277/178; 62/DIG. 13; 248/56, 57; 220/93 R; 29/450, 460

[56] References Cited

U.S. PATENT DOCUMENTS

| | | | |
|---|---|---|---|
| 1,218,216 | 3/1917 | Schmid | 16/2 |
| 2,060,942 | 11/1936 | Kline et al. | 220/448 |
| 2,544,394 | 3/1951 | Muffly | 62/267 |
| 2,608,191 | 8/1952 | Schmidt et al. | 62/333 |
| 2,797,955 | 7/1957 | Wilfert | 174/153 G |
| 2,799,528 | 7/1957 | Wilfert | 174/153 G |
| 3,011,743 | 12/1961 | Heath | 248/27 |
| 3,115,225 | 12/1963 | Froylilk et al. | 52/718 |
| 3,123,389 | 3/1964 | Biesecker | 24/221 R |
| 3,240,502 | 3/1966 | Snyder | 277/100 |
| 3,745,612 | 7/1973 | Selkerson | 24/73 PF |
| 3,918,605 | 11/1975 | Butler | 220/63 R |
| 4,020,644 | 5/1977 | True | 62/DIG. 13 |

FOREIGN PATENT DOCUMENTS

2321154 11/1973 Fed. Rep. of Germany ............. 248/56
1538622 7/1968 France ................................. 174/153 G

*Primary Examiner*—Dave W. Arola
*Attorney, Agent, or Firm*—Frederick P. Weidner; Radford M. Reams

[57] ABSTRACT

A transition sleeve for a double wall structure such as a refrigerator cabinet used to pass tubing or the like through juxtaposed apertures formed therein. The sleeve includes a unitary tubular body of relatively rigid material having a plurality of radially extending integral locking tabs at one end thereof for securing to one of the refrigerator walls through a complementary apertured opening. The tabs have camming faces formed thereon to facilitate rotation about the opening after being inserted therethrough. On a radially extending plane offset from the locking tabs are a plurality of equiangularly disposed stop pads which positively locate the rotational position of the sleeve on the wall. The longitudinal ends of the body include annular flanges which are flared outwardly to sealingly engage the walls perimetrically of the apertures on the cavity side thereof. The tubing is sealed to the core of the sleeve by the use of gum or the like.

10 Claims, 6 Drawing Figures

TRANSITION SLEEVE FOR A CABINET OR THE LIKE

CROSS REFERENCE TO RELATED MATTER

This application is related to commonly assigned copending application Ser. No. 864,970 filed on the same date by the same inventor hereof.

BACKGROUND OF THE INVENTION

Evaporators for refrigerators, including freezers, comprise a tubular member for the circulation of refrigerant and an extended heat transfer heat exchange surface for providing the desired heat exchange between the refrigerant and the air circulated over the evaporator.

In many modern refrigerators the evaporator is housed in a chamber separate from the refrigerator storage area and the refrigerator compressor is normally disposed at the bottom of the refrigerator underneath the food storage cabinet. Since the condenser is mounted external of the food storage area it is necessary to pass the refrigerant tubing from the outside to the inside of the refrigerator wherein the evaporator is housed.

The refrigerant tubing is threaded through juxtaposed openings in the refrigerator inner liner and the outer cabinet face. Since the cavity formed by the inner and outer walls contains insulation material it is necessary to isolate the tubing from the insulating material and to prevent moisture from penetrating the insulation. In the past rubber plugs or grommets have been inserted through the openings in the cabinet walls and material such as fiberglass insulation is stuffed circumferentially about the refrigerant tubing. It has been more recently known to use a transition sleeve formed of two parts inserted from both sides of the walls and then fastened in some suitable fashion such as by screwing together. Although this latter mentioned sleeve allowed for better sealing characteristics over the first mentioned method, it still was relatively more expensive to fabricate and required a plurality of assembly steps.

SUMMARY OF THE INVENTION

It is therefore an object of the present invention to provide a transition sleeve of one piece construction which may be easily assembled in combination with a refrigerator wall structure and provide a moisture resistant seal for the insulation provided between the refrigerator outer case and inner liner. It is a further object to provide a transition sleeve which may be rotationally fixed in the refrigerator cabinet in order to prevent any axial or radial displacement thereof. Still further it is an object of this invention to provide a transition sleeve having annular seals which are operative over a wide range of manufacturing and assembly tolerances. It is another object to provide a transition sleeve for a refrigerator cabinet which after being secured to one wall provides a locating feature allowing the other wall to be easily located thereon during the assembly process.

In accordance with the illustrated embodiment of the present invention, there is provided a transition sleeve for a refrigerator cabinet comprising a unitary tubular body of relatively rigid material having annular flanges formed integrally therewith to seal the juxtaposed apertures formed in the refrigerator walls and providing passage means to permit the refrigerant tubing to be routed from the evaporator through the walls of the refrigerator to the compressor. Preferably, the sleeve includes integral mounting means comprising a plurality of radially extending locking tabs which pass through complementary notches formed diametrically of one of the openings in the outer wall. The tabs have camming faces formed thereon to permit rotational movement within the opening after being inserted therethrough, the camming faces being formed on an obtuse axially extending plane corresponding to the direction of rotation of the sleeve. On a radially extending plane offset from the locking tabs there is provided a plurality or equiangularly radially extending detents which are adapted to engage the notches upon rotation of the sleeve. The other end of the sleeves may also include a longitudinal extension of the body which is used to locate the opening in the other wall when the second wall is assembled to the outer casing. The annular flanges prevent moisture from reaching the insulation material which is introduced in the cavity formed by the two walls, and also prevents the insulation material from escaping outwardly of said cavity.

DESCRIPTION OF THE PREFERRED EMBODIMENT

While the present invention is applicable to any refrigerator including one or more storage compartments and an evaporator for cooling the compartment disposed in an evaporator chamber remote from the compartments, it will be particularly described with reference to a refrigerator such as that described in U.S. Pat. No. 3,320,761, issued to Gelbard and assigned to the same assignee hereof, to which reference is made for detailed description of refrigerator components.

Figure 1:
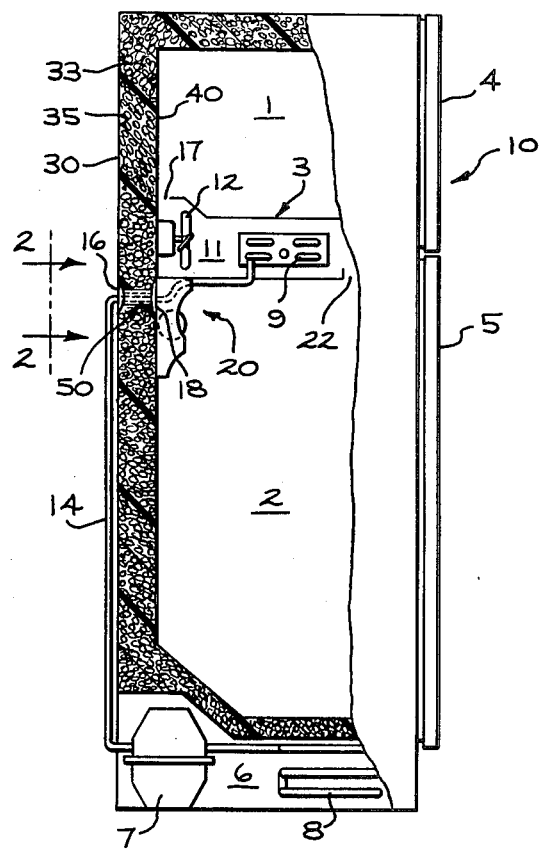
FIG. 1 is a schematic elevational view, partly in section, through a portion of the refrigerator including the present invention.

With reference to FIG. 1, the illustrated refrigerator 10 comprises an upper below-freezing or freezer compartment 1 and a lower above-freezing or fresh food storage compartment 2 separated by an insulated partition, generally indicated by the numeral 3. The access opening to the freezing compartment 1 is closed by means of an insulated door 4 while the access opening to the fresh food compartment 2 is closed by means of a door 5. A machinery compartment 6 in a lower portion of the cabinet contains the refrigerant condensing component of a refrigeration system including a hermetic motor-driven compressor 7 and a condenser 8.

In the illustrated embodiment of the invention, the single evaporator 9 for refrigerating the two compartments 1 and 2 is contained within an evaporator chamber 11 formed within the insulated partition 3. It is to be understood that the compressor 7, the condenser 8, suitable flow restriction means (not shown) and the evaporator 9 are connected in closed series flow relationship to form the usual closed refrigerant circuit.

For the purpose of maintaining the two storage compartments 1 and 2 at their desired operating temperatures, air streams from these two compartments are passed over the evaporator 9 and the refrigerated or cooled air returned to the compartments by means of a single fan generally indicated by the numeral 12. More specifically, the inlet portion of the evaporator chamber 11 is connected by means of a relatively large louvered inlet (not shown) at the forward end of the partition 3 to the freezer compartment 1 and the major portion of the air cooled or refrigerated by the evaporator 9 is returned to the freezer compartment through an air passage shown schematically as 17. The air leaving the passage 17 is often routed to an area housing freezing trays.

Air from the fresh food compartment 2 enters the inlet end of the evaporator chamber 11 through one or more passages or ducts 22 which is relatively smaller than the inlet from the freezer chamber wherein it becomes mixed with the air flowing into the evaporator chamber from the freezer compartment 1 before passing over the evaporator 9. A relatively small portion of the cool refrigerated air flowing from the rear or outlet end of the chamber 11 passes downwardly through an outlet passage (not shown) supplying cooled air to the fresh food compartment.

Mixing means, generally shown by the reference numeral 20, are provided for automatically and continuously mixing the refrigerated air flowing through the outlet with air from the fresh food compartment 2 before it is introduced into the compartment 2. One such device is illustrated and described in detail in the aforementioned U.S. Pat. No. 3,320,761. Preferably, the evaporator is periodically defrosted by use of a radiant heater such as that described in U.S. Pat. No. 3,280,581 issued to Turner and assigned to the assignee hereof. Such a heater (not shown) is positioned to one side of a coil section or when more than one section is employed is positioned between and parallel to the adjacent sections. Due to the open coil structure, heat from a radiant heater so placed will rapidly warm all portions of the evaporator to defrosting temperatures.

A vertically extending tube 14 from condenser 8 rises behind the refrigerator 10 and passes through an aperture 16 in the refrigerator outer wall 30 and then through a juxtaposed aperture 18 formed in the refrigerator inner or liner wall 40 where it is then routed to the evaporator 9. There is illustrated between the aperture 16 and 18 a transition sleeve 50 according to the present invention.

In accordance with the prefered embodiment of this invention, the transition sleeve 50 is first mounted to the outer wall 30. The inner liner 40 is then installed and a foam insulation material 33 is introduced within the cavity 35 formed by the walls 30 and 40 respectively. As is known in the art of refrigerator cabinets, relatively high pressures are produced during the foaming operation. A transition sleeve according to the present invention however takes constructive advantage of this increased pressure to enhance the sealing of the openings 16 and 18 as will be described hereinbelow. With the utilization of a sleeve according to the present invention the need for and attendant cost of cutting a passage through the insulation after it has been permitted to rigidify has been eliminated. Further, as will be seen below, the method of sealing tube 14 within sleeve 50 is greatly simplified making the sleeve even more economically attractive.

The transition sleeve 50 includes a tubular body portion 51 which is formed of a relatively rigid material such as thermoplastic, for example. One suitable example of the thermoplastic material is Polypropylene.

Figure 2:
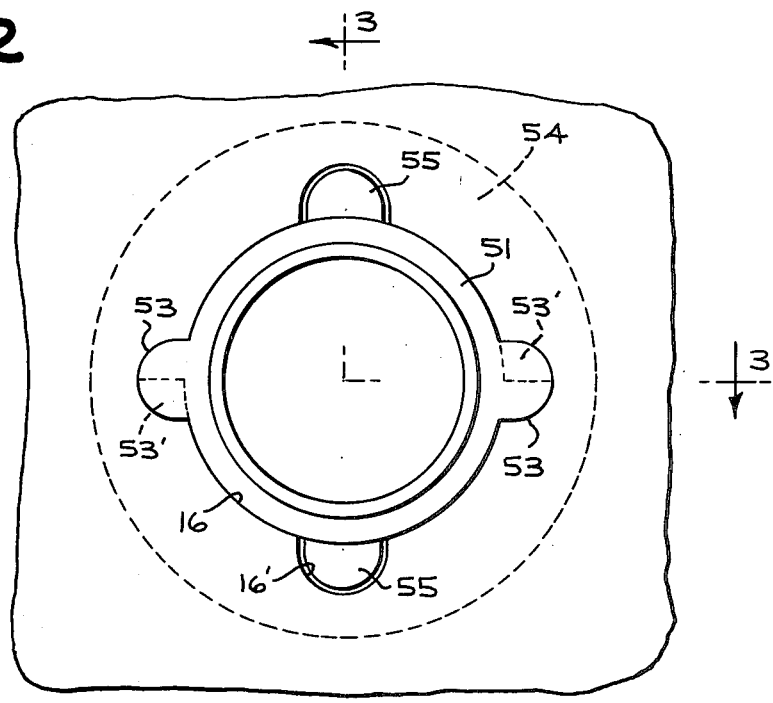
FIG. 2 is a fragmentary enlarged view of a portion of a refrigerator taken generally along lines 2—2 of FIG. 1, with the refrigerant tubing removed.
Figure 3:
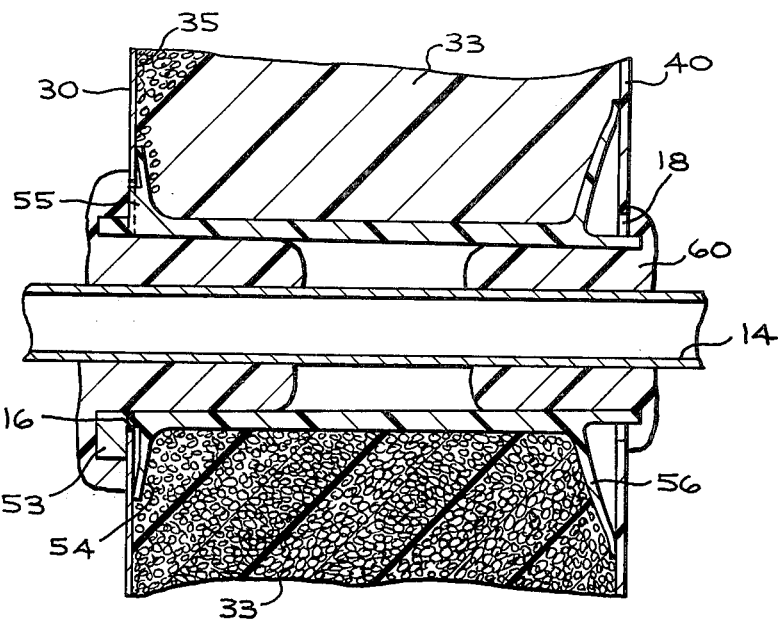
FIG. 3 is a fragmentary sectional view of the refrigerator cabinet and transition sleeve of this invention taken along lines 3—3 of FIG. 2, illustrating the insulation and refrigerant tubing in place.
Figure 4:
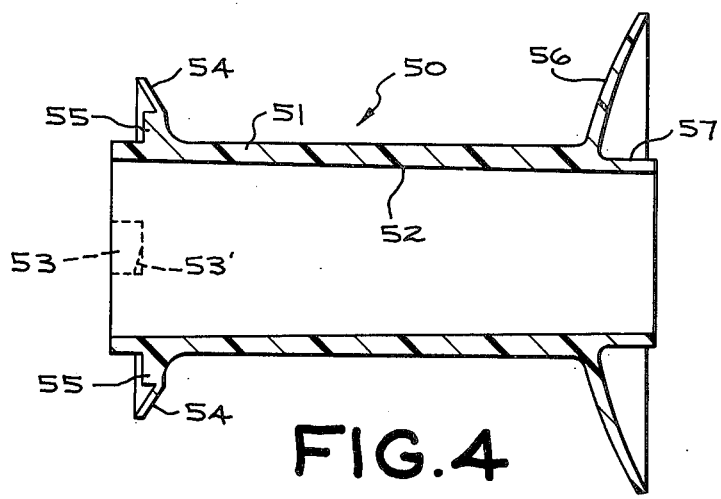
FIG. 4 is a sectional view in elevation of a transition sleeve according to the present invention.
Figure 5:
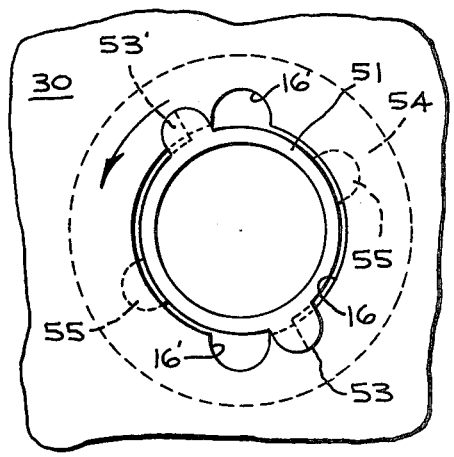
FIG. 5 is a fragmentary enlarged view of the transition sleeve being assembled to one of the refrigerator walls.
Figure 6:
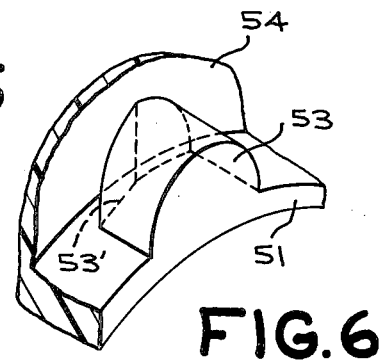
FIG. 6 is a partial perspective view, partly in section, of a portion of the transition sleeve of the present invention.

Referring to FIG. 4, the transition sleeve 50 is shown in more detail. As mentioned above the sleeve comprises a longitudinal body portion 51 having a hollow core 52 through which the tubing 14 is routed as shown n FIG. 1. Formed integrally with the body 51 at one end thereof are a plurality of radially extending locking tabs 53 which project circumferentially of the body portion 51. As shown in FIG. 2 there are two tabs 53 disposed 180° one from the other, however, it will be appreciated by those skilled in the art that more tabs could be used without departing from the scope and intent of this invention. Each of the mounting or locking tabs 53 have a camming surface 53', these camming surfaces or faces being formed on an obtuse axially-extending plane on the rotationally forward-side thereof. As can be better seen by reference to FIGS. 3 and 5, when sleeve 51 is inserted or telescoped through opening or aperture 16 in the refrigerator outer wall 30 after passing through diametrically disposed complementary notches 16' formed therein, the camming surfaces 53' facilitate rotation within the opening when moved in a direction of the arrow shown in FIG. 5. Although a generally semi-circular arcuate projection 53 is shown, other shapes and sizes may also be used with equal effectiveness, providing the notches 16' are cut to conform to whatever geometrical shape is selected.

In close proximity to tabs 53 and spaced axially inwardly thereof there extends a first annular flange or seal member 54 projecting radially from body 51. Flange 54 is flared axially-outwardly so as to circumferentially envelope tabs 53. As is shown in FIG. 4 where the sleeve is shown in the unmounted state, the radial extremity of flange 54 also extend axially over at least a portion of tabs 53. When sleeve 50 is mounted to wall 30 as shown in FIG. 3, flange 54 is caused to be compressed or flexed against wall 30 causing a tight sealing engagement therewith circumferentially of the opening 16 formed therein.

On a radially extending plane disposed axially between said tabs 53 and said flange 54 there are a plurality of radially extending projections or stop tabs 55 extending circumferentially from said body member 51. The stop tabs or detents 55 have the same general configuration of the locking tabs 53 and are adapted to snap into the notches 16' as shown in FIG. 3, when the sleeve 51 is rotated in the direction of the arrow shown in FIG. 5. The "snapping" force is provided by the flexed flange 54. In the preferred embodiment the detents 55 are disposed at right angles to the locking tabs 53 in alternating relationship therewith. That is, the stop tabs 55 and locking tabs 53 are equi-angularly spaced circumferentially of the body member 51. One skilled in the art will appreciate that the stop tabs 55 and locking tabs 53 need not be spaced equi-angularly, and indeed, the number of stop tabs required need not equal the number of locking tabs in order to perform their function of preventing the sleeve 51 from displacement and prohibiting further rotational movement of the sleeve 51 in the aperture 16. However, a symmetrical relationship between stop tabs 55 and locking tabs 53 provide a generally uniform and consistent assembly force.

At the opposite end of the body member 51 as can be better seen in FIGS. 3 and 4 there is a second annular flange 56 formed integrally with the body 51 and extending radially therefrom. Flange 56 is preferably flared axially-outwardly of the tubular body 51. Flange 56 is of a diameter large enough to cover the aperture or opening 18 formed in the inner liner 40 while simultaneously providing allowances for manufacturing and assembly tolerances. When the liner wall 40 is assembled within the outer case 30 of the refrigerator flange 56 flexes or is compressed against the wall 30 in sealing engagement therewith. When insulation foam is introduced in the cavity 35 formed by the outer and inner walls 30 and 40 respectively, the pressure released in the foaming process further reacts against the convex portion of annular flange 56 thereby enhancing the sealing force and preventing insulation from escaping from the cavity 35.

In the preferred embodiment the tubular body member 51 includes an axial extension 57 which extends slightly beyond the outer axial limit of flange 56. Extension 57 facilitates the location of the opening 18 of the inner liner 40 on the sleeve 50.

When the assembly of the liner 40 to the refrigerator casing has been completed and the evaporator is installed therein, the refrigerant tubing 14 is routed through the hollow portion 52 of the sleeve 51 and a gum or glue-like 60 is placed circumferentially of the tubing 14 to prevent leakage of cool air from inside the food storage area 2. It will be appreciated that other structure or materials could also be used to block the air movement about the tubing 14 within the inner core 52 of the sleeve 51 such as a metal or rubber grommet.

In addition to providing a moisture tight seal with the insulation 33, it will also be appreciated that the sleeve according to this invention is not damaged in the foam insulation process but rather utilizes the increased foaming pressure to form an even better seal with the inner and outer walls. Thus, a transition sleeve is provided of one piece construction having excellent sealing characteristics and which lends itself to an efficient, effective and economic assembly process.

For purposes of exemplification, the particular embodiment of the invention has been shown and described according to the best present understanding thereof. However, it will be apparent that changes and modifications in the arrangement and construction of the parts thereof may be resorted to without departing from the spirit and scope of the invention. For example, the sleeve 50 could be first mounted to the inner wall 40 and then be moved into justaposition with outer wall 30 prior to the foaming process.

What is claimed is:

1. In combination a refrigerator cabinet having insulation contained in a cavity formed by first and second walls of said cabinet, the walls having juxtaposed openings therein through which tubing or the like may pass with the opening in the first wall having a plurality of notches and a transition sleeve, said sleeve comprising:
a unitary tubular body of a relatively rigid material;
mounting means formed at a first end of said body securing the body to the opening in the first wall, said mounting means including a plurality of locking tabs telescoped through the opening notches in the first wall and rotated thereabout;
said first end of said body including a first annular flange adapted to seal the opening on the cavity-side thereof;
a second annular flange at the second end of said body adapted to seal the opening in the second wall on the cavity side thereof; and
locating means formed on the second end of the body adjacent said second flange on the side opposite the first flange and inserted through the opening in the second wall on the sleeve.

2. The combination of claim 1 wherein said locating means comprises a longitudinal extension of said body inserted through the opening in the second wall.

3. The combination according to claim 1 wherein said locking tabs comprise projections extending radially from said tubular body.

4. The combination of claim 3 wherein said locking tabs are spaced laterally of said first annular flange and each of said tabs has a laterally extending camming face to facilitate perimetrical rotation about the opening.

5. The combination of claim 3 wherein the opening notches are formed diametrically thereof to receive said locking tabs.

6. The combination of claim 5 wherein said first end of said tubular body includes also a plurality of detents extending radially from said body and being angularly spaced to conform to the angular spacing of said locking tabs, said detents located axially between said tabs and said annular flange whereby said detents engage said notches to prohibit rotational movement after the locking tabs are telescoped through said notches and rotated within said opening, the first annular flange being drawn into sealing engagement with said first wall.

7. The combustion of claim 1 wherein said second annular flange is angularly flared toward said second wall to sealingly engage said wall perimetrically of the opening therein.

8. The combination of claim 1 wherein said first and second annular flanges are adapted to be flexed axially-outwardly toward said first and second walls when insulation material is introduced in said cavity.

9. A method of securing a unitary relatively rigid tubular sleeve member having a first and second end each with an annular flange and said first end having radially extending locking tabs to a double-walled insulated structure such as a refrigerator cabinet comprising:
telescoping a portion of the first end of said sleeve through an opening in the outside wall, said opening having a diameter less than the diameter of the locking tabs and complementary notches to receive the locking tabs therethrough;
securing the first end of said sleeve to said outside wall in flange sealing relation thereto by rotating the sleeve about said opening; and
locating an opening in the inside wall by passing the second end of the sleeve member generally axially through the opening in the inside wall so as to engage the second annular flange projecting therefrom with the inside wall perimetrically of the opening.

10. The method of claim 9 including the additional steps of introducing insulating foam in the cavity formed by the double-wall structure, the foam serving to further push against the annular flanges of said sleeve.

* * * * *